(12) United States Patent
Brown et al.

(10) Patent No.: US 9,299,092 B1
(45) Date of Patent: Mar. 29, 2016

(54) SELECTION OF AD UNITS OF A COMPOUND ADVERTISEMENT FOR DISPLAY

(71) Applicant: TAPJOY, INC., San Francisco, CA (US)

(72) Inventors: Hans-Frederick Brown, San Rafael, CA (US); Shane Mihelic-Booth, San Francisco, CA (US); Ravi Dev, Cupertino, CA (US)

(73) Assignee: Tapjoy, Inc., San Francisco, CA (US)

( * ) Notice: Subject to any disclaimer, the term of this patent is extended or adjusted under 35 U.S.C. 154(b) by 26 days.

(21) Appl. No.: 14/054,691

(22) Filed: Oct. 15, 2013

(51) Int. Cl.
*G06Q 30/02* (2012.01)

(52) U.S. Cl.
CPC .................................. *G06Q 30/0275* (2013.01)

(58) Field of Classification Search
CPC ................................................... G06Q 30/0255
USPC ....................................................... 705/14.53
See application file for complete search history.

(56) References Cited

U.S. PATENT DOCUMENTS

| | | | | |
|---|---|---|---|---|
| 7,162,221 | B2 * | 1/2007 | Spitz et al. | 455/406 |
| 7,725,502 | B1 * | 5/2010 | Badros et al. | 705/14.73 |
| 7,756,962 | B2 * | 7/2010 | Kitchen | G06Q 30/02 705/14.1 |
| 7,945,660 | B2 * | 5/2011 | Goyal | G06F 17/30864 705/14.4 |
| 8,065,702 | B2 * | 11/2011 | Goldberg et al. | 725/22 |
| 8,521,584 | B1 * | 8/2013 | Feng | G06Q 30/08 705/14.1 |
| 8,694,373 | B2 * | 4/2014 | Umeda | 705/14.46 |
| 2009/0125398 | A1 * | 5/2009 | Cochran | G06Q 30/0273 705/14.69 |
| 2010/0063881 | A1 * | 3/2010 | Ghosh | G06Q 30/02 705/14.54 |
| 2010/0191600 | A1 * | 7/2010 | Sideman | 705/14.53 |
| 2010/0280866 | A1 * | 11/2010 | Moon et al. | 705/8 |
| 2012/0047031 | A1 * | 2/2012 | Sanghavi | 705/14.73 |
| 2012/0101904 | A1 * | 4/2012 | Spooner et al. | 705/14.72 |
| 2013/0006734 | A1 * | 1/2013 | Ocko | G06Q 30/08 705/14.12 |
| 2013/0018734 | A1 * | 1/2013 | Perret | 705/14.73 |
| 2013/0166389 | A1 * | 6/2013 | Michalopoulos et al. | 705/14.66 |
| 2013/0218665 | A1 * | 8/2013 | Abbott | G06Q 30/02 705/14.43 |
| 2013/0246173 | A1 * | 9/2013 | Berkley | G06Q 30/02 705/14.53 |

OTHER PUBLICATIONS

Thaler, Richard H. (1988). "Anomalies: The Winners Curse". Journal of Economic Perspectives 2 (1): 191-202.*
Thaler, Richard (1988), Anomalies: The Winner's Curse, University of Chicago Press, J. of Economic Perspectives 2 (1): 191-202.*

* cited by examiner

*Primary Examiner* — Thomas M Hammond, III
*Assistant Examiner* — Breffni X Baggot
(74) *Attorney, Agent, or Firm* — Hickman Palermo Becker Bingham LLP

(57) ABSTRACT

In an embodiment, a digital data specification of a compound advertisement comprising a plurality of ad units is received at an advertisement delivery server computer, where the digital data specification of the compound advertisement specifies one or more sequential dependencies between one or more ad units of the plurality of ad units and a bid value for each ad unit of the plurality of ad units. Based at least in part on a particular sequential dependency of the first ad unit upon a second ad unit of the same compound advertisement and a bid value associated with the first ad unit, a first ad unit of the compound advertisement is selected for display at a separate user computing device using the advertisement delivery server computer. The first ad unit is caused to display at the particular user computing device.

18 Claims, 8 Drawing Sheets

SELECTION OF AD UNITS OF A COMPOUND ADVERTISEMENT FOR DISPLAY

TECHNICAL FIELD

The present disclosure relates to techniques for selecting and causing display of ad units of a compound advertisement at a user computing device. More specifically, the present disclosure relates to techniques for selecting an ad unit from a plurality of ad units based on one or more sequential dependencies and bid discrimination.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many publishers of computer program applications ("apps") generate revenue from the distribution of their applications by displaying advertisements within the applications. For example, a mobile app developer may program an app such that advertisements ("ads") occasionally are displayed in one or more graphical user interfaces of the app when the app executed at a user computing device. In exchange for the display of the ads in an app, the publisher may receive compensation from advertisers according to known advertising compensation models. By displaying such advertisements, many application publishers are able to generate profits while providing the application to users for free or at a reduced price.

Some advertisements aim to be effective in such a platform by offerings some sort of incentive for a user to interact with the advertisement. For example, some advertisements may announce "Click here to win a prize." However, such advertisements often have little influence upon the user. That is, a user may click or otherwise interact with an advertisement to gain an incentive but may give little attention to the topic being advertised. Advertisements could be more effective if ads could be delivered in a way that enables the ads to leave a greater impression upon the user.

SUMMARY OF THE INVENTION

The appended claims may serve as a summary of the invention.

DETAILED DESCRIPTION

Figure 1:
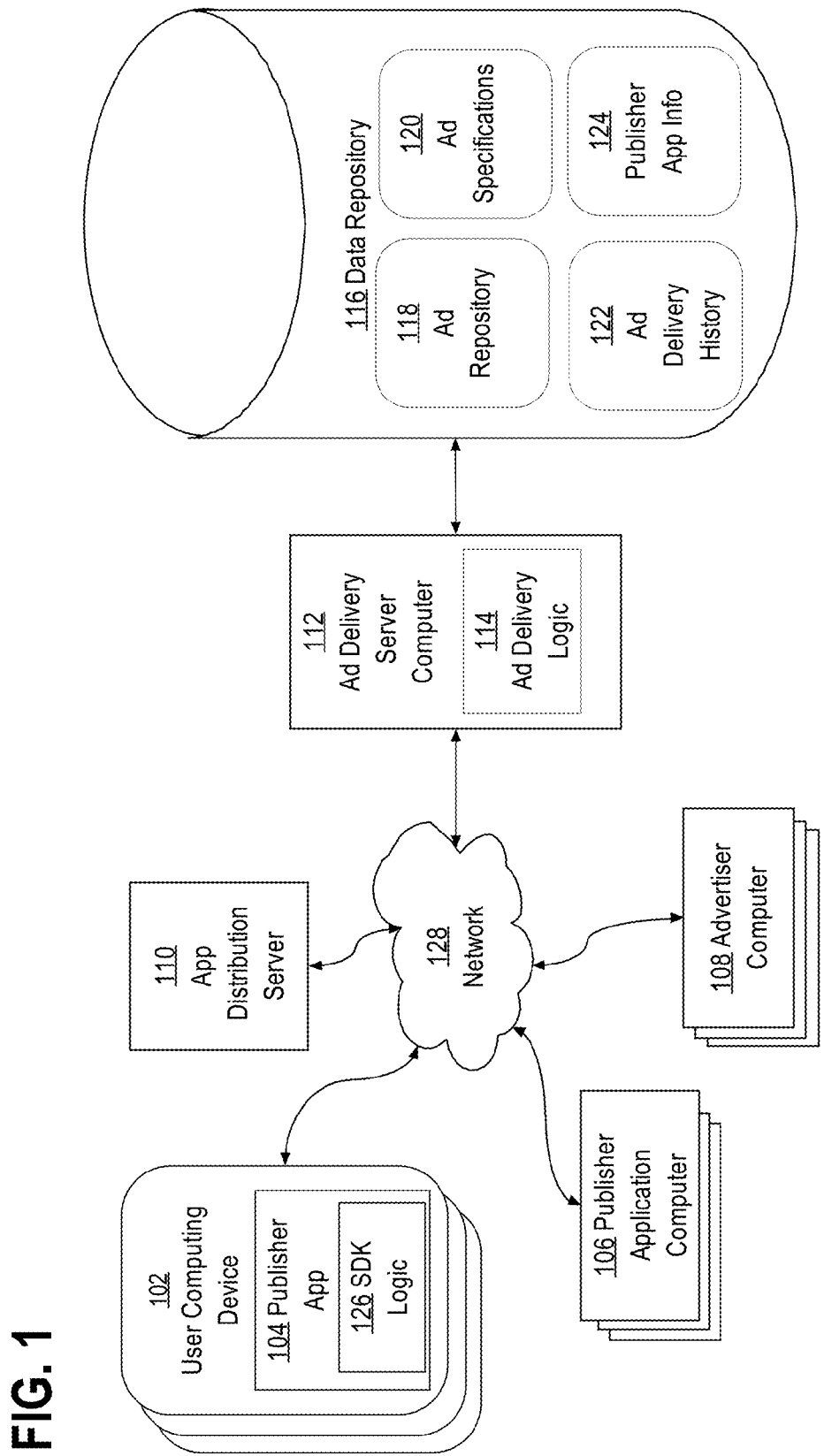
FIG. 1 illustrates a networked computer system arrangement that may be used to implement an embodiment.

Techniques for selecting and causing display of ad units of compound advertisements are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
      2.1 Example System
      2.2 Example Process for Selecting and Causing Display of an Ad Unit
         2.2.1 Registration of a Publisher Application
         2.2.1 Specification of a Compound Advertisement
         2.2.2 Identification of Ad Units Eligible for Display
         2.2.3 Selection of an Ad Unit for Display Based on Bid Discrimination
      2.3 Software Development Kit (SDK) Integration
   3.0 Implementation Mechanisms—Hardware Overview
   4.0 Extensions and Alternatives

1.0 GENERAL OVERVIEW

In an embodiment, a digital data specification of a compound advertisement comprising a plurality of ad units is received at an advertisement delivery server computer, where the digital data specification of the compound advertisement specifies one or more sequential dependencies between one or more ad units of the plurality of ad units and a bid value for each ad unit of the plurality of ad units. Based at least in part on a particular sequential dependency of the first ad unit upon a second ad unit of the same compound advertisement and a bid value associated with the first ad unit, a first ad unit of the compound advertisement is selected for display at a separate user computing device using the advertisement delivery server computer. An electronic digital message is transmitted from the advertisement delivery server computer to a particular user computing device, where the message is configured to cause display of the first ad unit at the particular user computing device.

In an embodiment, a digital data specification of a compound advertisement comprising a plurality of ad units is received at an advertisement delivery server computer, where the digital data specification of the compound advertisement specifies one or more sequential dependencies between one or more ad units of the plurality of ad units of the compound advertisement, including a particular sequential dependency of a first ad unit of the plurality of ad units upon a second ad unit of the plurality of ad units and bid value for each ad unit of the plurality of ad units. It is determined that a monetization event has occurred in a publisher application at a particular user computing device. In response to the determination that the monetization event has occurred in the publisher application at the particular user computing device, using the advertisement delivery server computer, the first ad unit of the compound advertisement is selected for display at the particular user computing device based on (1) a determination that a first message configured to cause display of the second ad unit was previously transmitted to the particular user computing device, (2) a determination that the first ad unit is associated with a particular app event type and the monetization event is of the particular app event type, and (3) a determination that a bid value associated with the first ad unit is greater than a bid value associated with a third ad unit. A second electronic digital message is transmitted from the advertisement delivery server computer to the particular user computing device, where the second electronic digital message is configured to cause display of the first ad unit at the particular user computing device.

Using the approaches described herein, an advertiser may deliver different ad units of the same compound advertisement to the same user, but at different times of the day, during interaction with different apps, during different usage sessions of the same app, or even at different mobile devices of the same user. The different ad units may relate to a single topic and may together tell a "story" that the user can relate to. For example, a compound ad advertising a running shoe may comprise a first ad unit featuring the running shoe being used in an "early-morning" scene. The second ad unit may feature the same running shoe in a "lunchtime" scene and may only be displayed during lunchtime and to users that had previously seen the "morning" scene. A third ad unit may also feature the same running shoe and may only be displayed to users that have seen both the first ad unit and the second ad unit. Such compound advertisements may be more effective than traditional approaches. The message of the advertisement is likely to create a bigger impact on a viewer that views the three ad units relating to the same topic at different times throughout the day, and perhaps during interactions with different apps, than other types of advertisements.

In some embodiments, the compound advertisements may be polymorphic. That is, different ad units from the same compound advertisement may be selected to display at different user computing devices depending on one or more factors such as the types of ad units that were previously displayed to the user computing devices, the types of publisher applications being used at the user computing devices, attributes of the user computing devices or users associated therewith, environmental attributes at the time that various monetization events occur, and other factors. For example, for users located in a location with sunny weather, the second ad unit may feature a sunny scene whereas, for users located in a location with rainy weather, the second ad unit may feature a rainy scene.

2.0 STRUCTURAL AND FUNCTIONAL OVERVIEW

2.1 Example System

FIG. 1 illustrates an example networked computer system arrangement that may be used to implement an embodiment. The computer system of FIG. 1 generally comprises at least one user computing device 102, a network 128, at least one ad delivery server computer 112 coupled to a data repository 116, at least one app distribution server 110, at least one publisher application computer 106, and at least one advertiser computer 108.

User computing device 102 may be any of a variety of computing devices including, but not limited to, a mobile computing device such as a smartphone, tablet computer, netbook computer, laptop computer, or a personal desktop computer. User computing device 102 may be one of a plurality of user computing devices communicatively coupled to network 128. Network 128 broadly represents one or more local area networks, wide area networks, internetworks, global interconnected internetworks such as the public internet, or a combination thereof.

Publisher applications such as publisher app 104 may be installed upon one or more user computing devices such as user computing device 102. Publisher app 104 may be any of a variety of different applications including, but not limited to, a game app, a utility app, a product-related app, or another app. User computing device 102 may download publisher applications such as publisher app 104 from app distribution server 110. Publisher app 104 may comprise SDK logic 126 which causes publisher app 104 to notify ad delivery server computer 112 of the occurrence of various monetization events within publisher app 104.

App distribution server 110 is associated with a developer, author, or publisher of a mobile device app, or a distribution channel such as a centralized app downloading service; examples include the APPLE APP STORE and GOOGLE PLAY service.

Ad delivery server computer 112 may cause advertisements such as various ad units of various compound advertisements to display at user computing devices such as user computing device 102. The ad units may be caused to display in response to the occurrence of monetization events at the user computing devices. The ad units may be served to user computing device 102 by ad delivery server computer 112 or by another ad inventory server. The ad units may be served to an app installed on user computing devices 102 such as publisher app 104, which may cause the ad to display upon user computing device 102. The ad units may be served to publisher app 104 by ad delivery server computer 112 or by another ad inventory server at the instruction of ad delivery server computer 112. In a commercial embodiment, advertisement delivery server 122 is associated with an advertisement delivery service operator such as Tapjoy, Inc., San Francisco, Calif.

Ad delivery server computer 112 may represent a single computer or a collection of computers and may be communicatively coupled, via network 128, to one or more publisher application computers such as publisher application computer 106 and one or more advertiser computers such as advertiser computer 108.

Publisher application computer 106 may be associated with a publisher whose application is registered with ad delivery server computer 112 as a publisher application. The registered application may be, for example, publisher app 104 installed upon user computing device 102.

Advertiser computer 108 may be associated with an advertiser that requests ad delivery server computer 112 to display advertisements of the advertiser at user computing devices such as user computing device 102.

Ad delivery server computer 112 may be communicatively coupled to data repository 116, which may store data obtained from user computing devices such as user computing device 102, from publisher application computers such as publisher application computer 106, from advertiser computers such as advertiser computer 108, and other data generated by ad delivery server computer 112. Data repository 116 may comprise ad repository 118, ad specifications 120, ad delivery history 122, and publisher app info 124.

Ad repository 118 may comprise the advertisement media to be delivered to user computing devices such as user computing device 102. Ad specifications 120 may comprise information related to the ad units such as sequential dependencies between ad units, bid values associated with various ad units, constraints on the display of ad units such as recipient constraints, app event type constraints, and environmental attribute constraints, or any combination thereof. At least some data of ad specifications 120 may be determined based on advertisement specifications obtained from advertiser computers such as advertisement computer 108.

Ad delivery history 122 may indicate which ad units have been sent for display and to which user computing devices. Sending an ad unit for display to a user computing device may comprise sending a message configured to cause the ad unit to display at the user computing device. Ad delivery history 122 may identify the one or more ad units that were sent in association with device IDs identifying the devices to which the ad units were sent.

Publisher app info 124 comprises information about one or more publisher applications registered with advertisement delivery server computer 112. The registration information may include monetization event definitions identifying various monetization events that may occur in the one or more publisher applications and constraints upon the type of ad units that may display in response to the various monetization events. At least some data of publisher app info 124 may be determined based on publisher application registrations obtained from advertiser computers such as publisher application computer 106.

Ad delivery logic 114 may comprise instructions for selecting and causing display of advertisements at user computing devices such as user computing device 102 based in part on the information in data repository 116.

2.2 Example Process for Selecting an Ad Unit

Figure 2:
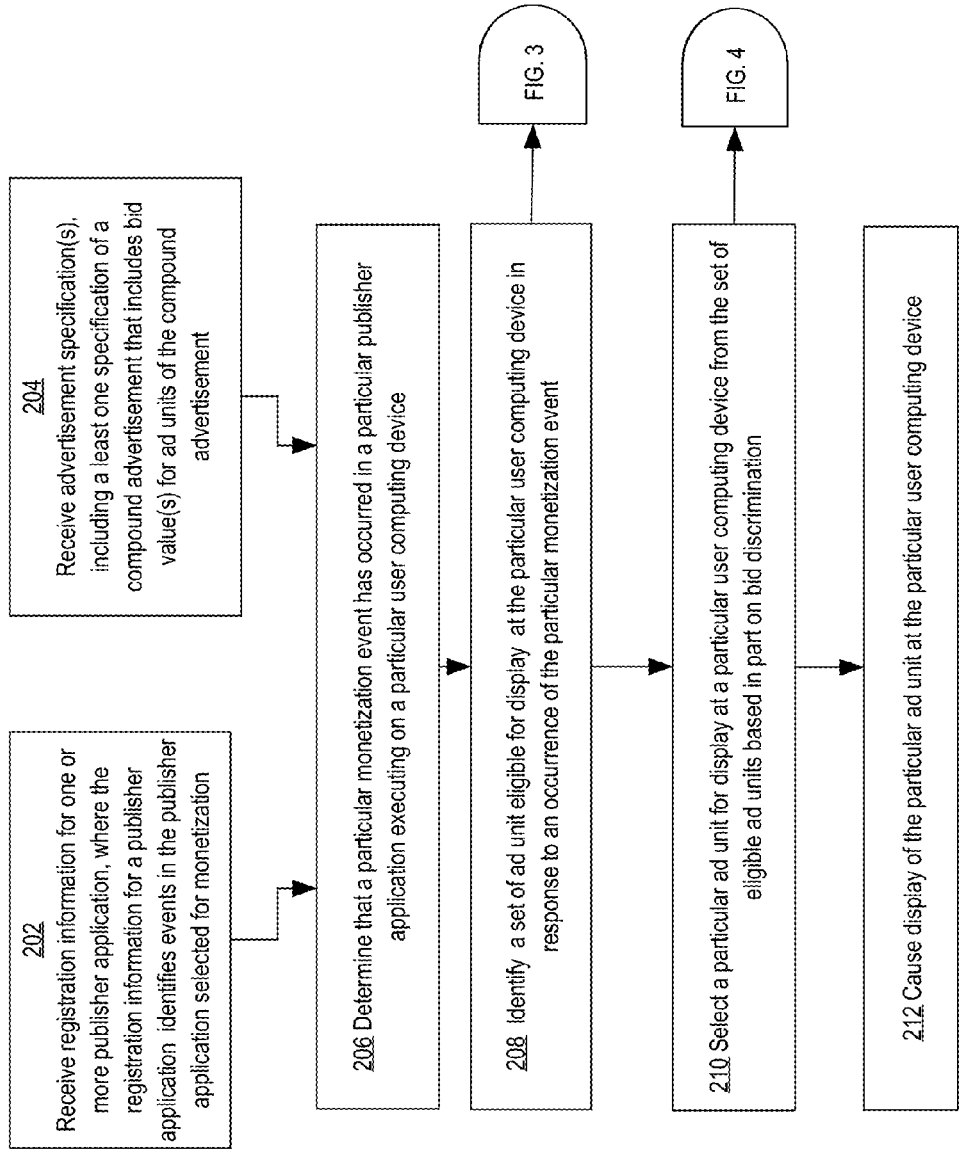
FIG. 2 illustrates an example process for selecting an ad unit to display at a particular user computing device.

FIG. 2 illustrates an example process for selecting an ad unit to display at a particular user computing device. The process of FIG. 2 may be performed at ad delivery server computer 112. In an embodiment, one or more of the steps described below may be omitted, repeated, or performed in a different order. The specific arrangement shown in FIG. 2 is not required.

2.2.1 Registration of a Publisher Application

At block 202, ad delivery server computer 112 receives registration information for one or more publisher application, where the registration information for a publisher application identifies events in the publisher application selected for monetizationion. An ad unit may be displayed at a user computing device in response to the occurrence of a monetization event in a publisher application executing at the user computing device. The publisher of the publisher application may receive a monetary payment or other consideration for allowing advertisements to be displayed in response to the occurrence of monetization events in the publisher application. For example, a publisher of a publisher app 104 may receive a monetary payment from an operator of the ad delivery service associated with ad delivery server computer 112 each time an ad unit ad delivery server computer 112 causes an ad unit to display at user computing device 102 in response to the occurrence of a monetization event in publisher app 104.

Ad delivery server computer 112 may receive a digital message from a publisher application computer such as publisher application computer 106 comprising the registration information. Publisher application computer 106 may be associated with a publisher of the publisher application. A "publisher" of an application may be, for example, a developer of the application or a distributor of the application. A publisher may register multiple different applications with the ad delivery service operated by ad delivery server computer 112. For example, a company may distribute multiple applications and may register each of the multiple applications with the ad delivery system because it wishes to monetize each of the multiple applications.

A publisher may enter publisher application registration information via a registration web console caused to display at publisher application computer 106 by ad delivery server computer 112. Via the registration web console, the publisher may identify each of the various events in the publisher app 104 that the publisher wishes to monetize.

Examples of application events that the publisher may identify as monetization events include application launch, application pause, and application exit. In an embodiment, publisher app 104 is a gaming application and the publisher may monetize app events such as game launch, game pause, and game exit. Publisher app 104 may feature levels, where certain accomplishments must be completed before a user is able to advance to the next level and app events such as level up and level fail may be monetized. Publisher app 104 may provide a tutorial, such as a tutorial on how to play a game in the app or complete an action using the app. In such an embodiment, app events such as tutorial launch, tutorial complete, and tutorial exit may be monetized. Other examples of monetization events include user dead, user out of virtual currency, launch of an in-game store, completion of a purchase in an in-game store, exiting of an in-game store.

In an embodiment, in addition to sending publisher application registration information to ad delivery server computer 112, a publisher of the publisher application may also integrate an ad delivery software development kit (SDK) with the publisher application. Publisher application computer 106, which may be associated with the publisher, may obtain the software development kit (SDK) from ad delivery server computer 112. After the ad delivery software development kit (SDK) has been integrated with the logic of a publisher application, the publisher application device may send a monetization event notification to ad delivery server computer 112 each time a configured monetization event occurs in the publisher application.

In one embodiment, the integration process comprises modifying the native code of publisher app 104 to cause certain logical components of SDK logic 126 to execute in response to the occurrence of certain events in the app, such as events that have been selected as monetization events. For example, publisher app 104 may be modified to call a particular function that is implemented in SDK logic 126 every time a particular monetization event occurs. When the particular function that is implemented in SDK logic 126 executes, SDK logic 126 may send a notification to ad delivery server computer 112. The notification may indicate the type of the monetization event that occurred in publisher app 104 and other information such as a device identifier identifying user computing device 102.

Further details of one embodiment where SDK logic 126 is integrated with publisher app 104 are described below in "Section 2.3—Software Development Kit (SDK) Integration." In other embodiments, publisher app 104 may notify ad delivery server computer 112 of the occurrence of a monetization event without integrating any software development kit such as SDK logic 126.

In some embodiments, a publisher identifies a monetization event by selecting a pre-defined event type displayed as an option in the registration web console, indicating that the pre-defined event type occurs in the publisher app and has been selected by the publisher as a monetization event. In addition, a developer of publisher app 104 may include a code segment or other logic in association with the particular app event that links the occurrence of the particular app event with a component of SDK logic 126. That is, the occurrence of the particular app event may cause publisher app 104 to trigger the component SDK logic 126 when the particular app event occurs during execution of publisher app. When executed, the component may cause a particular notification to be sent to ad delivery server computer 112 indicating which event type has occurred in publisher app 104.

In some embodiments, a publisher may identify a custom monetization event that is not pre-defined. For example, if publisher app 104 is a news app that enables a user to read various news articles, the publisher of publisher app 104 may define a custom monetization event titled "Article Complete," where ad delivery server computer 112 is notified when a user exits out of reading a particular article in the news app. The publisher may input a name for the custom event type in the registration web console during the registration process, indicating that the custom event type occurs in the publisher app and has been selected by the publisher as a monetization event. A developer of publisher app 104 may include a code segment or other logic in association with the "Article Complete" app event that links the occurrence of the particular app event with a component of SDK logic 126.

The monetization event notifications sent by publisher app 104 to ad delivery server computer 112 may identify the particular event type that occurred. For example, in response to determining that the user has exited out of a reading a particular article in publisher app 104, publisher app 104 may send a notification to ad delivery server 112 including the message "Article Complete." In some embodiments, SDK logic 126 causes such a notification to be sent.

Using the web console, a publisher may specify constraints regarding format of ad units that may be displayed in response to the occurrence of a monetization event in the publisher app. The format constraints may be applicable to advertisement attributes such as media format, advertisement size indicating the amount of screen space occupied by the advertisement, and length of time the ad unit is displayed or played for. Examples of advertisement media formats that may be selected by the publisher as permissible ad types include, but are not limited to, video advertisements, static image advertisements, sound only advertisements, and interactive rich-media advertisements. Examples of advertisement sizes include full-screen advertisement or a banner advertisement that only occupied a portion of the screen. During the registration process, a publisher may enter input into the web console via publisher application computer 106 and the registration information may be sent to ad delivery server computer 112 via network 128.

In one embodiment, the publisher may associate different constraints with different monetization events. For example, publisher app 104 may be an e-reader app where the publisher of publisher app 104 defines a first monetization event titled "Read Five Pages" which occurs when the user has clicked a "Next Page" option four times while reading a single article in publisher app 104. The publisher may define a second monetization event titled "Article Complete" which occurs when the user exits out of a particular article. Because the "Read Five Pages" monetization event is likely to occur more frequently than the "Article Complete" monetization event and because the advertisement would be interrupting a user action, the publisher may prefer to make advertisements triggered by the "Read Five Pages" monetization event less intrusive than the advertisements triggered by the "Article Complete" monetization event. Thus, the publisher may specify a first constraint associated with the "Read Five Pages" monetization event specifying that only advertisements that display or play for under five (5) second may display in response to the "Read Five Pages" monetization event and may specify a second constraint associated with the "Article Complete" monetization event specifying that only advertisements that display or play for under ten (10) second may display in response to the "Read Five Pages" monetization event.

In an embodiment, one or more monetization events belong to app event type categories. For example, each monetization event may belong to the category of "positive," "negative," or "neutral" depending on whether the event being monetized is a desired event, undesired event, or neutral event in the publisher app from the perspective of the user. A "positive" event may be the occurrence of an achievement within the applications. For example, in a gaming application, app events of the user winning the game or advancing to the next level after beating one level may belong to the category of "positive" app events. A "negative" app event may be the occurrence of an obstacle or setback within the application. Referring again to a game app example, an undesired event may be the loss of a virtual life or the loss of energy.

Pre-defined monetization events may be assigned an app event type category by ad delivery server computer 112. For example, the monetization event of "level up" may be automatically assigned to the "positive" app event category. In some embodiments, the assigned app event category may be a default category which may be changeable by a publisher computer such as publisher application computer 106. Publisher application computer 106 specifies app event categories for one or more custom monetization event defined by the publisher application computer. For example, publisher application computer 106 may specify a monetization event of "User Injured" and may indicate that the app event belongs to an app event category of "negative" app events.

The publisher may specify a minimum bid level for each monetization event. Ad delivery server computer 112 may only cause an ad unit to display in response to monetization event if the bid value offered by an advertiser for the ad unit equals or exceeds the minimum bid value specified by the publisher for the monetization event. For example, a publisher may assign a high bid value to the "Read Five Pages" monetization event because it is high-value placement due to the fact that the attention of the user is likely to be highly focused upon the app at that time.

In an embodiment, the publisher may specify a plurality of bid values for a particular monetization event, where each bid value is applicable to a different type of advertisement. For example, the publisher may associate a higher minimum bid value with the display of an interactive rich-media ad unit in response to a particular monetization event as compared to the minimum bid value associated with the display of a static image advertisement in response to the same particular monetization event.

In some embodiments, ad delivery server computer 112 receives registration information for hundreds of different publisher applications.

A publisher may manage publisher application registration information via a management web console that is caused to display at a publisher computer such as publisher application computer 106 by ad delivery computer 112. Using the console, the publisher may track the amount of money generated per app or per monetization event. The publisher may also one or more aspects of the specification using the console.

In some embodiments, the publisher may register certain app events without selecting them for monetization. The app events may also be linked with SDK logic 126 such that ad deliver server computer 112 to be notified of their occurrence.

Using the web console, the publisher may view the frequency with which such non-registered monetization events occur. The publisher may select further app events for monetization, or remove app events from monetization on the basis of such information presented via the management web console.

2.2.1 Specification of a Compound Advertisement

At block 204, ad delivery server computer 112 receives advertisement specification(s), including at least one specification of a compound advertisement that includes bid value(s) for ad units of the compound advertisement. The advertisement specification(s) may be received from a plurality of different advertiser computers, such as advertiser computer 108, each of which may be associated with different advertisers.

Figure 5:
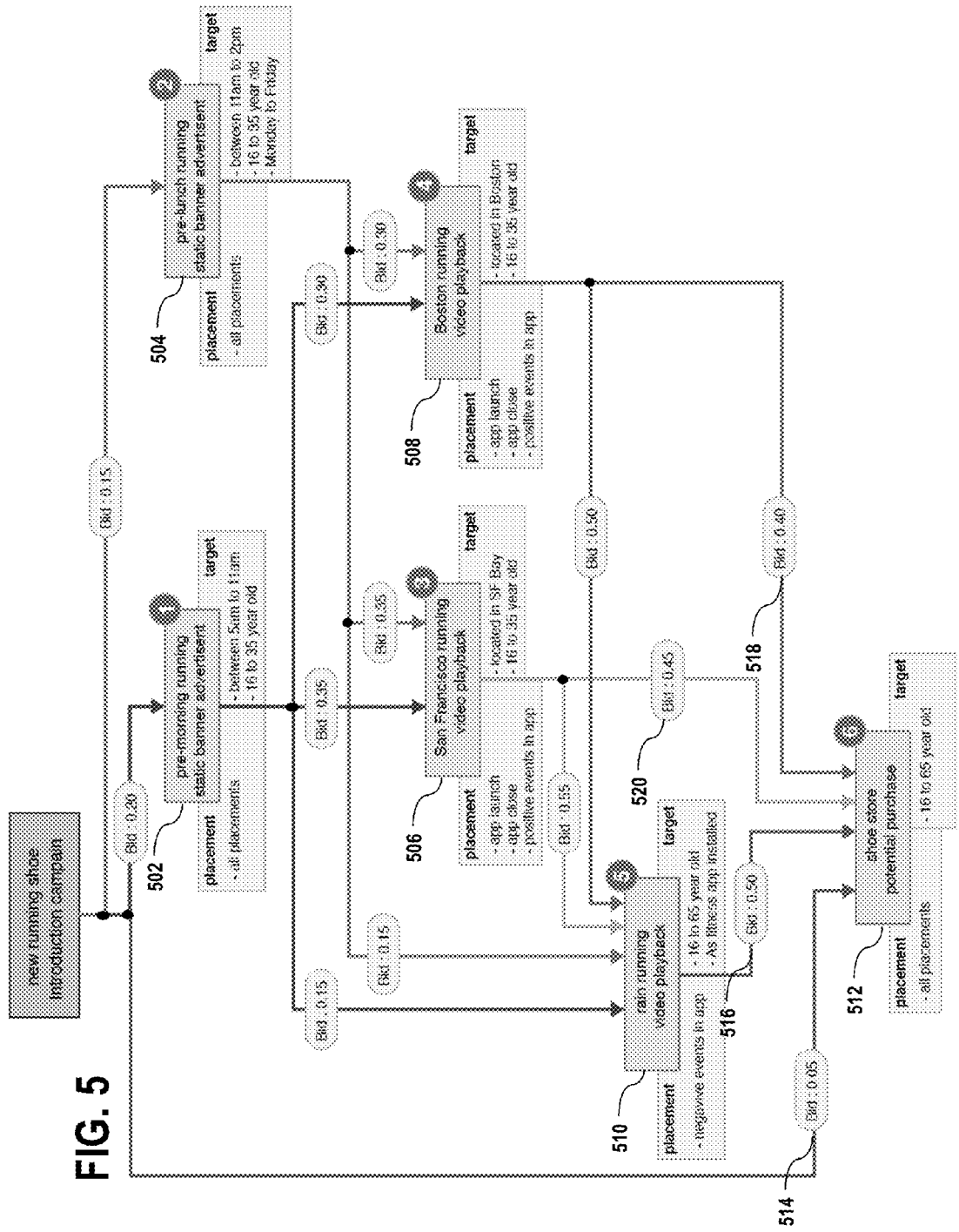
FIG. 5 illustrates an example compound advertisement.

FIG. 5 illustrates an example compound advertisement titled "New Shoes Intro Campaign." The "New Shoes Intro Campaign" compound advertisement includes six ad units including ad unit 502 which is a static graphic image of a pre-morning running scene advertising a particular running shoe. For example, ad unit 502 may be a static image of the running shoe located near a cup of coffee and granola bar. Ad unit 504 is a static graphic image of a pre-lunch running scene advertising the same particular running shoe. For example, ad unit 504 may be a static image of the running shoe located near a gym bag in an office environment. Ad unit 506 is a video of San Francisco running scene advertising the particular running shoe. For example, ad unit 506 may be a video of a runner running past the Golden Gate Bridge in San Francisco. Ad unit 508 is a video of Boston running scene advertising the particular running shoe. For example, ad unit 508 may be a video of a runner running past the Charles River in Boston. Ad unit 510 is a video of a rain running scene advertising the particular running shoe. For example, ad unit 510 may be a video of a runner running in the rain in a generic location. Ad unit 512 is an interactive advertisement that, for example, allows a user to customize and purchase a particular shoe.

The advertisement specification sent from advertiser computer 108 to ad delivery server computer 112 may include the ad media for each of the ad units and a specification of the media type of each ad unit.

The advertisement specification may define sequential dependencies between ad units of compound ad units. Some sequential dependencies may be required. That is, an ad unit may only be displayed if the sequential dependency is satisfied. Other sequential dependencies may be optional. For example, ad unit 512 is optionally sequentially dependent on ad unit 510. That is, ad unit 512 is eligible for display even if ad unit 510 is not displayed, although the bid value associated with the ad unit may be less if the sequential dependency upon ad unit 510 is not satisfied. Ad unit 512 is associated with a default bid value 514 of $0.05 which applies if none of the sequential dependencies applicable to ad unit 512 are satisfied. Ad unit 512 is also associated with the higher bid value 516 of $0.50 which applies if the sequential dependency upon ad unit 510 is satisfied.

A sequential dependency of a first ad unit upon a second ad unit at a user computing device may be satisfied if a particular advertisement action relating to the second ad unit is completed at the user computing device. In some embodiments, the particular advertisement action relating to the second ad unit at the user computing device is the display of the second ad unit at the user computing device. That is, a sequential dependency applicable to the first ad unit may be satisfied if the second ad unit was previously displayed at the user computing device.

In other embodiments, the particular advertisement action associated with the sequential dependency may be some other action, such as the clicking of a component of the second ad unit at the user computing device or some form of conversion of the second ad unit. Ad units may be converted, for example, if the user signs up for an offer identified within the second ad unit at the user computing device or a user downloads a software identified within with the second ad unit at the user computing device.

In some embodiments, a sequential dependency set comprising a plurality of sequential dependencies may be associated with an ad unit. According to one embodiment, a particular sequential dependency set may be satisfied if each of the plurality of sequential dependencies in the set. According to another embodiment, a particular sequential dependency set may be satisfied if any of the sequential dependencies in the set are satisfied. For example, ad unit 510 is sequentially dependent on the display of ad units 502, 504, 506, or 508. Ad unit 510 may only be eligible for display at a particular user computing device if none of ad units 502, 504, 506, and 508 were previously displayed at the particular user computing device. Thus, the set of sequential dependencies applicable to ad unit 510 is required. One of the sequential dependencies of the set of sequential dependencies must be satisfied for ad unit 510 to be eligible for display. In other embodiments, the set of sequential dependencies may be optional. That is, ad unit 510 may still be eligible for display even if none of the sequential dependencies are satisfied.

In some embodiments, sequential dependencies apply on a per-user basis rather than a per-device basis. For example, ad delivery server 122 may maintain a list of device identifiers associated with a user and ad unit 512 may be eligible for display at a particular user computing device associated with a particular user if ad unit 510 was previously displayed at any of the various user computing device associated with the particular user.

Advertisement specifications may also specify acceptable app event types for one or more ad units in the compound advertisement. In some embodiments, an ad unit may only be displayed in response to monetization events of the type associated with the ad unit. For example, advertiser computer 108 may specify that a particular ad unit of a particular compound advertisement is associated with the app event types of application launch and tutorial complete. The particular ad unit may only be displayed at a user computing device in response to the occurrence of an application launch or tutorial completion.

Different ad units may be compatible with different app event types. For example, a second ad unit of the particular compound advertisement may be a video advertisement that offers to purchase virtual currency usable in the publisher app on behalf of the user if the user watches the video until completion. Advertiser computer 108 may specify that the second ad unit may only be displayed at a user computing device in response to occurrence of a "User Out of Virtual Currency" monetization event.

Other ad units may be associated with all app event types. In an embodiment, an ad unit is associated with all app event types by default. The associated app event types may be different only if an advertiser specifies a different set of acceptable app event types.

Advertisement specification may specify acceptable app event categories for one or more ad units. For example, a particular ad unit may be geared to users which may be in a negative mood, such as ad units intended to lift a user's spirit by granting him some reward while displaying a company logo or a product, where the reward is usable within the publisher app or elsewhere. Advertiser computer 108 may associate the particular ad unit with the app event category of "negative" to ensure that the particular ad unit displays in response to the occurrence of a negative monetization even in a publisher app. The "negative" category may comprise a plurality of different app events such as "User Out of Funds" or "User Defeated." As another example, a second ad unit may be high-energy video that is more relatable to users in an enthusiastic mood. Advertiser computer 108 may associate the second ad unit with the app event category of "positive" to ensure that the user's mood is positive at the time the second ad unit is displayed.

Ad unit 506, which is the San Francisco video playback scene, and ad unit 508, which is the Boston running video play back scene, are both associated with the app event category of "positive." Ad unit 510, which is the rain running video playback scene, is associated with the app event category of "negative." The advertiser of the "New Running Shoes Intro Campaign" compound ad may wish for ad units to match the mood of the user at the time the ad unit is displayed. The video of ad unit 510 may depict a gloomy setting and thus the advertiser may wish for ad unit 510 to display in response to a negative occurrence in a publisher app, such as a user losing a game within the app. Similarly, video of ad unit 506 and 508 may depict an upbeat setting and thus the advertiser may wish for ad units 506 and 508 to display in response to a positive occurrence in a publisher app, such as a user winning a game within the app.

An advertisement specification for the compound advertisement may specify recipient constraints, which are constraints upon the type of device upon which an ad unit may be displayed or upon the type of user associated with the device. Recipient constraints may include constraints on user age, user gender, user or device location, the types of applications installed by the device or user in the past, the types of applications recently accessed by the user or device, device type, technical capabilities of the device, including computing power, internet speed and, operating version, and other user or device attributes. For example, ad unit 510 is associated with a recipient constraint indicating that ad unit 510 may only be delivered to devices associated with users who are determined to be between 16 and 65 years old. Ad unit 510 is also associated with a recipient constraint indicating that ad unit 510 may only be delivered to devices that have previously installed a fitness application. A location constraint may require the device to be located less than a threshold amount of distance away from any one of a plurality of locations. For example, a particular ad unit may only be displayed to devices located within thirty (30) miles of a storefront associated with the advertiser.

An advertisement specification may specify constraints on environmental attributes for the time at which an ad unit is displayed. For example, ad unit 504, which is a pre-lunch running scene, is associated with a time constraint of 11 AM-2 PM and may not be displayed outside that time window. Another example environmental constraint is a location constraint. For example, ad unit 506, which comprises a San Francisco running scene, is associated with a location constraint of San Francisco Bay and may only be displayed to devices located in the San Francisco Bay area. Another example of an environmental constraint is a constraint on the weather at the time at which the ad unit is displayed. For example, ad delivery server computer 112 may cause an ad unit depicting a rainy scene to display at a user computing device only at a time when it is raining at the location of the user computing device. Such constraints may allow advertisers to target ads to users that are target consumers of the advertisers, and at the time at which they are best able to relate and thus be influenced by the advertisement.

The advertisement specification may specify at least one bid value for each ad unit. Different ad units of the same compound advertisement may be associated with different bid values. Ad delivery server computer 112 may select an ad to display at a user computing device based at least in part on the bid values. Thus, an advertiser may choose to associate higher bid values with preferred ad units. For example, ad unit 512 is associated with a bid value $0.05 and ad unit 502 is associated with a bid value of $0.20. An advertiser may strategically assign such bid values to ensure that ad unit 512 is displayed over ad unit 502 if both ad units are eligible for display.

The bid value may represent a price to be paid by the advertiser to the ad delivery service operator associated with ad delivery server computer 112 in response to the completion of an advertisement action associated with the ad. The particular advertisement action could vary according to different embodiments and depending on the agreement between the ad delivery system and the advertiser. In an embodiment, the ad delivery system is paid for each time the advertisement is displayed. In other embodiments, the ad delivery system is paid for each time a user clicks upon the advertisement or upon some form of conversion of the advertisement, such as a user signing up for an offer identified within the advertisement or a user or downloading a software identified within with the advertisement.

In some embodiments, the advertisement specification may associate different bid values with the same ad unit. The different bid values may be associated with different sequential dependencies and may only be applicable if the corresponding sequential dependency is satisfied. For example, as indicated by bid values 514, 516, 518, 520, ad unit 512 is associated with at least four different bid values depending on which sequential dependencies, if any, of the three optional sequential dependencies applicable to ad unit 512 are satisfied. Bid value 514 indicates that at least $0.05 will be paid for the completion of an advertisement action associated with ad unit 512 at a particular user device if none of the advertisement actions associated with ad units 510, 506, and 508 are previously completed at the particular user device. Bid value 516 indicates that at least $0.50 will be paid for the completion of an advertisement action associated with ad unit 512 at a particular user device, if an advertisement action associated with ad unit 510 was previously completed at the particular user device. Bid value 518 indicates that at least $0.40 will be paid for the completion of an advertisement action associated with ad unit 512 at a particular user device, if an advertisement action associated with ad unit 508 was previously completed at the particular user device. Bid value 520 indicates that at least $0.45 will be paid for the completion of an advertisement action associated with ad unit 512 at a particular user device, if an advertisement action associated with ad unit 506 was previously completed at the particular user device.

If two sequential dependencies are satisfied, the applicable bid value may be the higher of the bid values associated with the two sequential dependencies. For example, if ad unit 512 is displayed at a particular user device after both ad units 510 and 506 are displayed at the particular user device, the applicable bid value may be $0.50 because it is the higher of the two amounts associated with the two sequential dependencies.

In some embodiments, a sequential dependency may specify that an ad unit is sequentially dependent upon a sequence of ad units. For example, an advertiser may agree to pay a first bid value if ad unit 512 is displayed after ad unit 510 was displayed, and if ad unit 510 was displayed after ad unit 506 was displayed. The advertiser may agree to pay a second, different bid value if ad unit 512 is displayed after ad unit 510 was displayed, and if ad unit 510 was displayed after ad unit 508 was displayed.

An advertiser may strategically associate different bid values with different ad units, where the ad units are each associated with different constraints. The advertiser may also strategically associate different bid values with the same ad unit depending on which, if any, of the different associated sequential dependencies are satisfied. For example, by pricing bid values and associating constraints strategically, ad advertiser may cause certain ad units to only be displayed to higher-value users and in higher-value circumstances, or may pay a greater amount for the display of the certain ad unit when it is displayed to the higher-value users in the higher-value circumstances. For example, a circumstance where the user has previously seen two other ad units of the same compound may be considered a high-value circumstance. A user within a very small target demographic may also be considered a high-value user.

As one example, the bid value associated with the display of ad unit 512 at a device after a particular advertisement action associated with 510 has been completed at the device is higher than the bid value associated with the display of ad unit 512 at a device when no such sequential dependency has been satisfied. The opportunity to display the "Shoe Store Potential Purchase" ad of ad unit 512 to a user that has viewed the "Rain Running Video Playback" ad of ad unit 510 and one of the other ads upon which ad unit 510 is sequentially dependent may be considered a high value circumstance by an advertiser. Thus, the advertiser may agree to pay a higher bid value to display ad unit 512 to a user in such a circumstance than to display to a user who has not seen the prior ad units in the sequence.

Viewing a sequence of ad units pertaining to the same topic creates a bigger impact on the viewer than viewing one individual advertisement pertaining to the topic. By allowing the delivery of these advertisements to also target other attributes, such as the occurrence of particular app events, environmental attributes, and recipient attributes, the ad units may also be more relatable to the viewer. An ad delivery system that allows advertisers to strategically purchase the opportunity to tell such an advertisement "story" offers a great benefit to advertisers.

An ad delivery system that allows advertiser to specify constraints, sequential dependencies, and varied bid values for different ad units of a single compound advertisement also benefits ad delivery service operators because of the higher payment amounts advertisers may be willing to pay for such high-value ad delivery opportunities.

In an embodiment, the advertisement specification specifies a base bid value and a bonus bid value for each ad unit. The bonus bid value may be specified in the form of a reserve value and the bonus bid value may be determined by adding the reserve value to the base bid value. For example, a particular ad unit may be associated with a base bid value of $0.55 and with a reserve value of $0.50. Thus, the bonus bid value associated with ad unit may be the sum of the reserve value and the base bid value, which is $1.05. In some embodiments, if no bonus bid value is specified for an ad unit, ad deliver server computer 112 considers the bonus bid value to be the same as the base bid value.

In response to receiving notification of the occurrence of a monetization event at a publisher application on a user computing device, ad delivery server computer 112 may select an ad unit for display, from a plurality of different ad units provided by a plurality of different advertisers, based in part on the bid values associated with the ad units. The bonus bid value of a particular ad unit may be considered if another ad unit has a base bid value that exceeds the base bid value of the particular ad unit.

In some embodiments, an advertiser specifies different reserve values for different ad units of a compound advertisement. In other embodiments, a single reserve value is specified for the entire compound ad unit which is applicable to each ad unit of the compound advertisement. For example a particular reserve value may apply to all the ad units of a compound advertisement.

Figure 6:
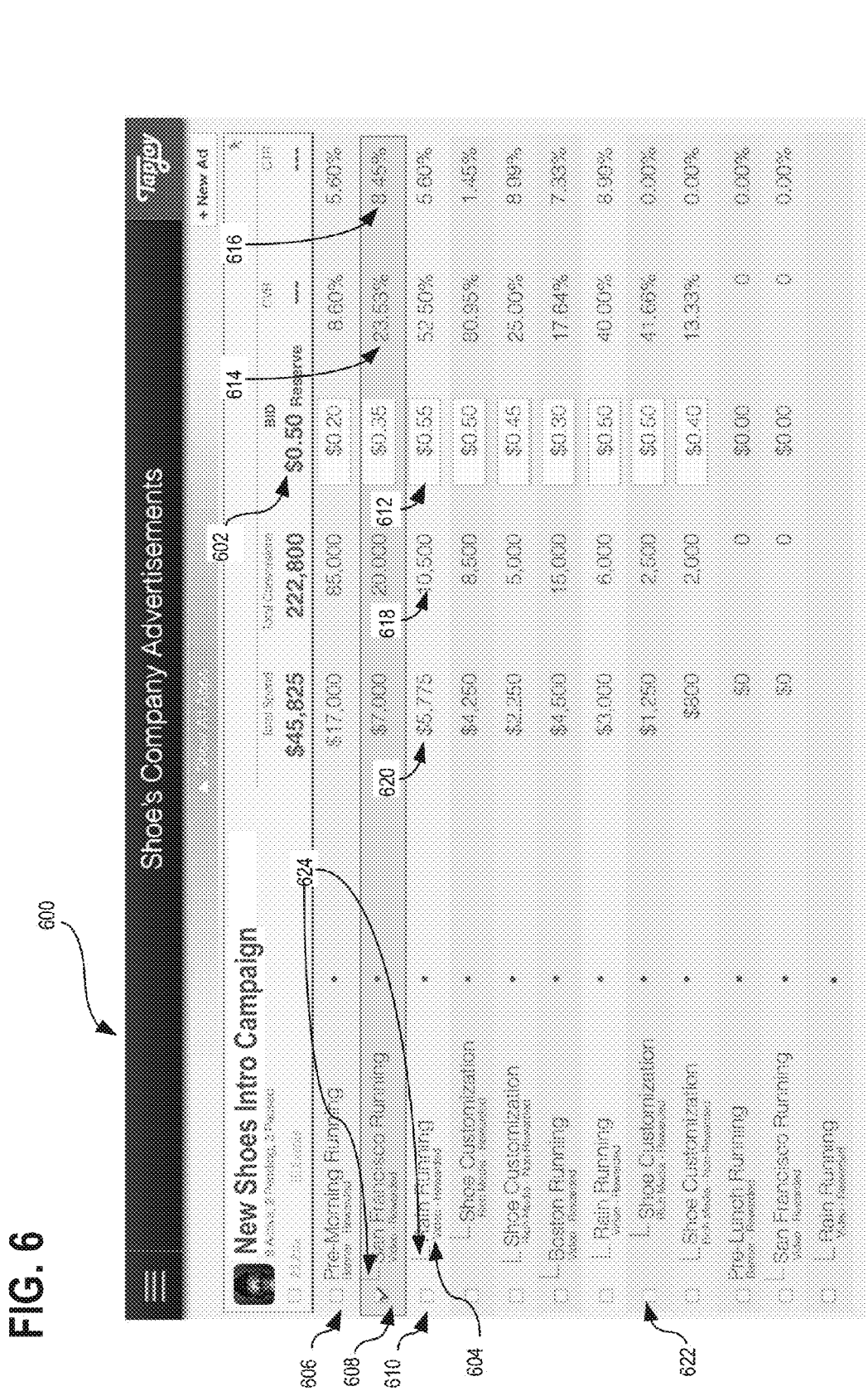
FIG. 6 illustrates an example graphical interface that may be used to manage and modify a specification of a compound advertisement.

FIG. 6 illustrates an example graphical interface that may be used to manage and modify a specification of a compound advertisement. Graphical interface 600 may be a web console displayed at a computer associated with an advertiser such as advertiser computer 108. FIG. 6 illustrates a user interface that is used to manage a compound ad titled "New Shoes Intro Campaign."

Prior to the display of interface 600, a publisher may have provided a specification for the "New Shoes Intro Campaign" compound ad specifying that the compound ad comprises six ad units including ad unit 606 titled "Pre-Morning Running," ad unit 608 titled "San Francisco Running," and ad unit 610 titled "Rain Running." Media type indicator 604 indicates that ad unit 610 is a video advertisement.

Bid value 612 is associated with a particular sequential dependency of ad unit 610 upon a sequence of ad units comprising ad unit 606 followed by ad unit 608, as indicated by sequential dependency indicators 624. If the particular sequential dependency is satisfied, the associated advertiser may be granted bid value 612 of $0.55 for the completion of a particular advertisement action associated with ad unit 610. For example, if ad unit 608 is displayed at a user device after ad unit 606 is displayed at the user device and if ad unit 610 is displayed at the user device after ad unit 608 is displayed at the user device, bid value 612 may apply to the display of ad unit 610 at the user device.

Reserve value 602 of $0.50 may be applicable to all ad units in the compound ad. In other embodiments, different ad units of a compound ad may be associated with different reserve values.

Interface 600 also provides information regarding the performance of the ad units in the compound advertisement. CVR value 614 indicates the percentage of times the display of ad unit 608 results in a conversion of the ad unit. The action that constitutes a conversion of an ad unit may vary according to different embodiments but may be, for example, a user purchasing an item via a link or other information provided in ad unit 610, signing up for information via ad unit 610, or downloading an item information via ad unit 610. CTR value 616 indicates the percentage of times the display of ad unit 608 results in a click upon the ad. Conversion amount 618 indicates the total number of times the display of ad unit 610 resulted in a conversion. Spend amount 620 indicates the total amount spent for advertisement actions relating to ad unit 610 after the advertisement action relating to ad unit 608 was completed following the completion of advertisement action relating to ad unit 606. The advertisement action associated with each of the ad units may be the display of the associated ad unit or may be, for some or all of the ad units, some further action such as a user clicking upon the ad unit.

In an embodiment, the specification for an entire compound advertisement may be specified before any of the ad units of the compound advertisement are displayed. The specification for the compound advertisement may include different bid values, different constraints, and different sequential dependencies for each ad unit. In some embodiments, the entire specification may be specified in a single transaction.

Figure 7:
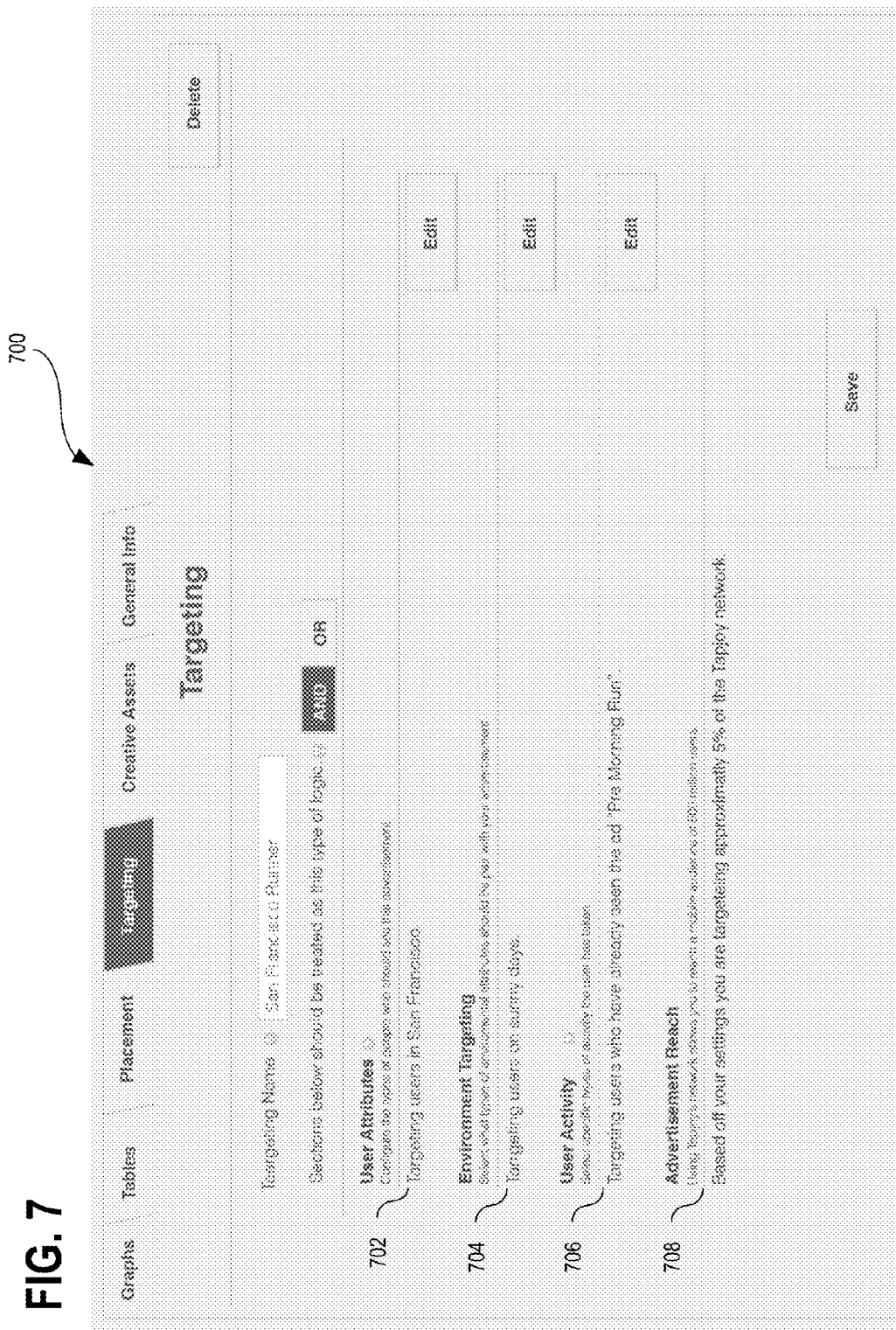
FIG. 7 illustrates an example graphical interface that may be used to manage and modify a specification of a compound advertisement.

FIG. 7 illustrates an example graphical interface that may be used to manage and modify a specification of a compound advertisement. Graphical interface 700 may be a web console displayed at a computer associated with an advertiser such as advertiser computer 108.

Interface 700 displays example constraints upon an ad unit and options for modifying the constraints. In an embodiment, interfaces 600 and 700 are shown together on a single screen and the options specified using interface 700 may apply to the ad units selected in interface 600 using checkboxes such as checkbox 622.

Field 702 of interface 700 indicates that selected ad unit(s) may only be displayed at user computing devices located in San Francisco. Field 704 indicates an environmental constraint that the selected ad unit(s) may only be displayed at a user computing device if the weather is sunny at the location of the user computing device. Field 706 indicates a particular sequential dependency of the selected ad unit upon a second ad unit titled "Pre Morning Run." Field 708 indicates the amount of users within the ad delivery system that are eligible to receive the selected ad unit(s) based on constraints specified for the selected ad unit(s). The values in Fields 702-706 may indicate advertiser input and the value in Field 708 may be calculated by the advertisement delivery server computer 112 based on the advertiser inputs.

By interacting with interface 700 using advertiser computer 108, an advertiser may edit each of the illustrated constraints.

An advertiser may change various attributes of the compound advertisement, such as sequential dependencies, bid values, and/or constraints by interacting with the web console. Such changes may be made without publishers needing to modify the logic of their apps or having to redeploy their aps.

2.2.2 Identification of Ad Units Eligible for Display

At block 206, ad delivery server computer 112 determines that a particular monetization event has occurred in a particular publisher application executing on a particular user computing device.

The particular publisher application may be publisher app 104 executing upon user computing device 102. In accordance with SDK logic 126, publisher app 104 may send a notification to ad delivery server computer 112 each time a monetization event occurs in publisher app 104 that identifies the particular monetization event that occurred.

At block 208, ad delivery server computer 112 identifies a set of ad unit eligible for display at the particular user computing device in response to an occurrence of the particular monetization event. The monetization event notification may identify the user computing device at which the monetization event occurred, the type of monetization event that occurred, and/or the publisher app in which the monetization event occurred.

In one embodiment, ad delivery server computer 112 uses a publisher app identifier and a monetization event identifier to locate the publisher specification information applicable to the particular monetization event from the store of specification information in data repository 116. The publisher specification information may include information identifying which app events are monetization events. Such information may be used to verify that an ad unit should be displayed in response to the incoming app event notification is to trigger. The publisher specification information may additionally include app event category information, minimum bid information, and/or ad constraints.

Figure 3:
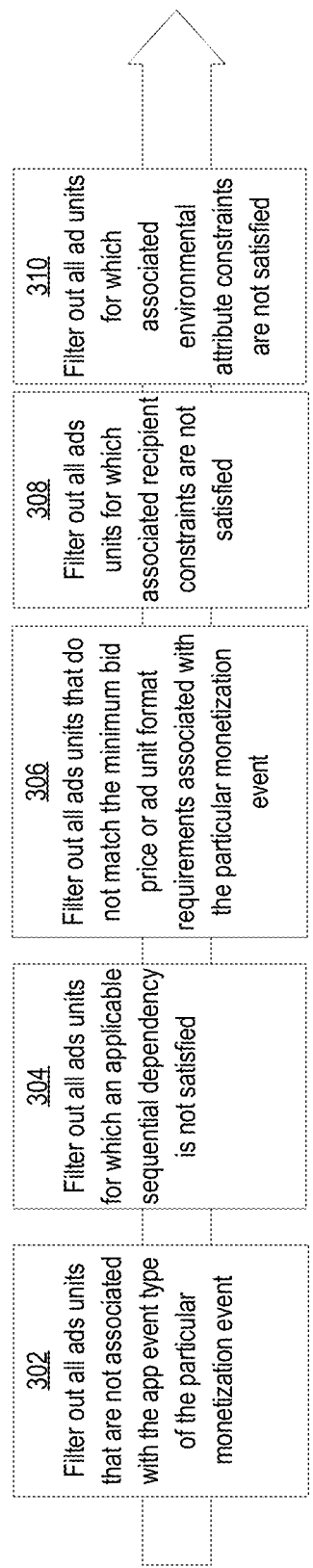
FIG. 3 illustrates an example process for identifying a set of ad units eligible for display at a particular user computing device in response to an occurrence of a particular app monetization event.

FIG. 3 illustrates an example process for identifying a set of ad units eligible for display at a particular user computing device in response to an occurrence of a particular app monetization event. The process of FIG. 3 may be performed at ad delivery server computer 112. In an embodiment, one or more of the steps described below may be omitted, repeated, or performed in a different order. The specific arrangement shown in FIG. 3 is not required.

Ad delivery server computer 112 may determine a preliminary set of ad units that includes different ad units registered by the different advertisers and belonging to different advertisements. Some of the ad units may be ad units that do not belong to any compound advertisement and others may be ad units of a compound advertisement.

At block 302, ad delivery server computer 112 filters out all ads units that are not associated with the app event type of the particular monetization event. For example, if the monetization event that occurred in publisher app 104 an "Applicant Launch" app event, ad delivery server computer 112 may filter out any ad units for which the advertiser indicated a set of acceptable app events that is not associated with the Applicant Launch" app event.

In embodiments where advertiser specifications specify acceptable app event categories for one or more ad units, ad delivery server computer 112 may also filter out any ad units that are not associated with an app event category to which the particular monetization event belongs.

At block 304, ad delivery server computer 112 filters out all ads units for which an applicable sequential dependency is not satisfied. In some embodiments, some sequential dependencies may be optional and others may be mandatory. In such an embodiment, ad unit may only be eliminated if a mandatory sequential dependency is not satisfied.

In an embodiment, ad delivery server computer 112 determines whether a sequential dependency of a first ad unit upon one or more ad units is satisfied by determining whether advertisement actions associated with the one or more units were performed at the particular user computing device upon which the monetization event occurred. For example, if a particular sequential dependency for a first ad unit indicates that the ad unit is only to be displayed if a second ad unit was displayed, ad delivery server computer 112 may determine whether the second ad unit was previously displayed at the particular user computing device. Determining whether the second ad unit was previously displayed at the particular user computing device may comprise determining whether a message configured to cause display of the second ad unit at the particular user computing device was previously sent to the particular user computing device. Ad delivery history 122 may store records of previously sent messages configured to cause display of ad units, each of which record may identify the user computing device to which the message was sent and which ad unit the message was configured to cause display of.

In an embodiment, the advertisement action associated with an ad unit may be something other than the display of the ad unit. For example, a sequential dependency may indicate that a first unit is only to be displayed at a user computing device if a second ad unit was previously displayed at the user computing device and also clicked upon, or otherwise selected, during display by the user of the computing device. In such an embodiment, a notification may be sent to ad delivery server computer 112 from the user computing device if an ad unit associated with ad delivery server computer 112 is clicked upon at the user computing device. Records of which ad units were clicked upon by which devices may be maintained in data repository 116, and the history may be accessed to determine if one or more sequential dependencies are satisfied.

In some embodiment, the actions associated with the sequential dependency must have all been performed at the particular user computing device upon which the monetization event occurred for the sequential dependency to be satisfied. In other embodiments, the sequential dependency may be satisfied if the actions associated with the sequential dependency were performed at different user computing devices, as long as the different devices were each associated with the same user. For example, ad delivery server computer 112 may determine that a message configured to cause display of a first ad unit of a compound ad was sent to a smartphone associated with a particular user in the morning. In the afternoon, ad delivery server computer 112 may receive a notification from a laptop device associated with the same particular user indicating the occurrence of a monetization event at the laptop device. In response, ad delivery server computer 112 may send a message configured to cause delivery of a second ad unit of the compound ad to the laptop device, where the second ad unit is associated with a mandatory sequential dependency of the second ad unit upon the first ad unit.

At block 306, ad delivery server computer 112 filters out all ads units that do not equal or exceed the minimum bid value or ad unit format requirements associated with the particular monetization event. A publisher of publisher app 104 may have specified a minimum bid value for the particular monetization event that occurred at publisher app 104 and ad delivery server computer 112 may eliminate from consideration any ad units whose bid value does not equal or exceed the minimum bid value. In some embodiments, advertisers specify both base bid values and bonus bid values. If the base bid value of an ad unit does not equal or exceed the minimum bid value associated with the monetization event and the bonus bid value does, ad delivery server computer 112 may not filter out the ad unit. Instead, ad delivery server computer 112 may use the bonus bid value as both the base bid value and bonus bid value during determination of the applicable payment price if the ad unit is subsequently selected for display.

A publisher of publisher app 104 may have associated particular ad unit format constraint(s) with the type of particular monetization event that occurred. For example, the publisher may have specified that the particular monetization event may only trigger the display of static images that are displayed for less than five (5) seconds and occupy less than half the screen. Ad delivery server computer 112 may eliminate from consideration any ad units whose format does not comply with those constraints.

At block 308, ad delivery server computer 112 filters out all ads units for which associated recipient constraints are not satisfied. Recipient constraints are constraints associated with ad units, which may have been specified by the advertiser of the ad unit, which may limit the type of user computing device at which the ad unit may be shown based on information about the user computing device or a user associated with the user computing device.

Ad delivery server computer 112 may determine information about the user computing device at which the monetization event occurred, and the associated user, in any of a plurality of different ways.

In one embodiment, user computing devices such as user computing device 102 may periodically send device or user information to ad delivery server computer 112, either within the notification messages notifying ad delivery server computer 112 of a monetization event occurrence or separately. In some embodiments, SDK logic 126 within publisher app 104 may cause such information to be sent to ad delivery server computer 112 from user computing device 102. For example, a notification message sent from user computing device 102 may identify the current location of user computing device 102 or an operating system of the user computing device 102.

In some embodiments, ad delivery server computer 112 may determine which publisher applications executed on a particular user computing device, and the time at which they executed, based on notifications received from the publisher applications. Ad delivery server computer 112 may also or instead be associated with an ad referral system which may track one or more applications that have been downloaded by user computing device 102, or at a different device by a user associated with user computing device 102. One or more applications referred by the ad referral system may notify the ad referral system when certain events in the application occur, such as the launching of the application. Ad delivery server computer 112 may access such device and user information collected by the ad referral system to determine information device activity information such as applications recently downloaded or executed at a particular device.

Some user or device information may be inferred based on other information known about the device or users. For example, ad delivery server computer 112 may determine that the particular user computing device downloads a category of apps that is commonly downloaded by users in the age group of 18-25 and may thus infer that the user associated with the user computing device is in the 18-25 age range. The gender of a user associated with a user computing device may also be inferred based upon the types of applications used or downloaded by the user computing device.

Some user or device information may be provided during a user registration process with the ad delivery system. For example, a user may input their zip code or age when creating an account with the ad delivery system.

Ad delivery server computer 112 may determine a device identifier identifying the computing device at which the monetization event occurred. In one embodiment, the monetization event notification sent to the ad delivery server computer 112 notifying the server about the occurrence of a monetization event may include the device identifier identifying the device at which the event occurred. In some embodiments, ad delivery server computer 112 may use the device identifier to look up information about the particular user computing device or a user associated with the user computing device by accessing a database of collected or inferred information about the device or a user associated with the device.

Information may be inferred about a user associated with the particular user computing device based on information collected about a different user computing device that is known to be associated with the particular user. For example, a user may be known to be associated with both a tablet device and a mobile phone device. Demographic information about the user may be inferred based on information received from the tablet device about applications used on the tablet device. Such user demographic information may be used to select an ad unit for display at the mobile phone device associated with the same user. In one embodiment, associations between users and devices may be learned from information provided by the user during an account registration process. For example, the user may identify various devices to ad delivery server computer 112 for association with the user's account.

At block 310, ad delivery server computer 112 filters out all ad units for which associated environmental attribute constraints are not satisfied. Environmental attribute such as time and weather may be determined based in part on other known information about the particular user computing device or an associated user, such as a location of the user computing device or user. For example, the current weather at the location of the user computing device may be determined by first determining the location of the user computing device and providing the location information to third-party weather serve to determine the weather at the location.

Ad delivery server computer 112 may determine acceptable app event types, sequential dependencies, minimum bid values, and/or constraints associated with each ad unit in the preliminary set by accessing ad specifications 120 in data repository 116.

In some embodiments, ad delivery server computer 112 may initially consider at least two ad units from the same compound ad unit for display at a user computing device. One or more of the at least two ad units may be filtered out due to a criteria described above, such as recipient constraints, environmental constraints, minimum bid values, and monetization event type limitations. For example, ad units 506 and 508 may both be included in the preliminary set of available ad units but ad unit 508 may be filtered out based on a determination that the particular user computing device is not located in Boston.

2.2.3 Selection of an Ad Unit for Display Based on Bid Discrimination

At block 210, ad delivery server computer 112 selects a particular ad unit for display at a particular user computing device from the set of eligible ad units based in part on bid discrimination.

Figure 4:
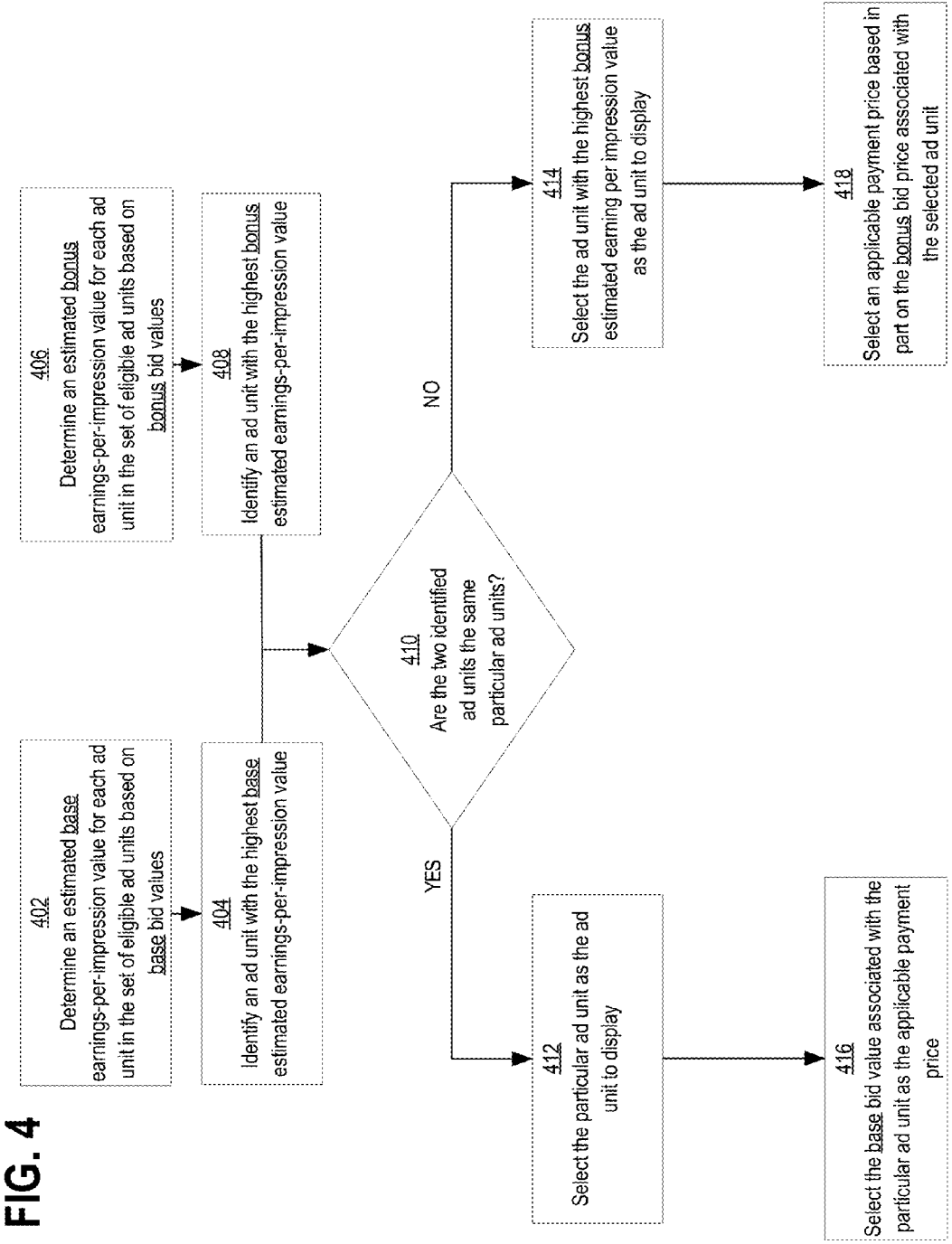
FIG. 4 illustrates an example process for selecting a particular ad unit for display at a particular user computing device from a set of eligible ad units based in part on bid discrimination.

FIG. 4 illustrates an example process for selecting a particular ad unit for display at a particular user computing device from a set of eligible ad units based in part on bid discrimination. The process of FIG. 4 may be performed at ad delivery server computer 112. In an embodiment, one or more of the steps described below may be omitted, repeated, or performed in a different order. The specific arrangement shown in FIG. 4 is not required.

At block 402, ad delivery server computer 112 determines an estimated base earnings-per-impression value for each ad unit in the set of eligible ad units based on base bid values. In one embodiment, the estimated base earnings-per-impression value for an ad unit is determined by adjusting the base value for an ad unit with the likelihood that the display of the ad unit will result in earnings for the ad delivery system.

The likelihood that the display of the ad unit will result in earnings for the ad delivery system may be determined based in part on any combination of a plurality of factors. In some embodiments, estimated base earnings-per-impression value may be determined based in part on the advertisement action that must be completed for the display to result in earning. For example, the advertisement action that must be completed for the display to result in an earning for a display of a first ad unit may be that the user must click on the ad unit. The advertisement action that must be completed for the display to result in an earning for a display of a second ad unit may be that the user must provide an email address and sign up for a mailing list by interacting with the second ad unit. Although the first ad unit and the second ad unit may have the same base bid value the estimated base earnings-per-impression value for the first ad unit may be higher because the user may be more likely to perform the advertisement action associated with the first ad unit than the second ad unit.

The likelihood that the display of the ad unit will result in earnings for the ad delivery system may additionally or instead be determined based in part on the media format of the ad, the type(s) of devices, users, and environments being targeted by the ad, percentage of previous ad units by the advertiser that resulted in earnings, or any combination thereof. For example, ad delivery server computer 112 may have determined that the 40-50 year old age group is more likely to click on an ad unit than the 25-40 year old age group and may thus adjust base bid values for the two groups differently.

At block 404, ad delivery server computer 112 identifies an ad unit with the highest base estimated earnings-per-impression value.

At block 406, ad delivery server computer 112 determines an estimated bonus earnings-per-impression value for each ad unit in the set of eligible ad units based on bonus bid values. An estimated base earnings-per-impression value for an ad unit may be determined by adjusting the bonus bid value for an ad unit by the likelihood that the display of the ad unit will result in earnings for the ad delivery system. Ad delivery server computer 112 may determine the likelihood that the display of the ad unit will result in earnings for the ad delivery system using one or more of the approaches described above with respect to block 402.

In some embodiments, if the advertiser of an ad unit does not specify a reserve or bonus bid value that is different from a base bid value, ad delivery computer 112 may consider the bonus bid value to be the same as the base bid value.

At block 408, ad delivery server computer 112 identifies an ad unit with the highest bonus estimated earnings-per-impression value.

At block 410, ad delivery server computer 112 determines if the ad unit with the highest base estimated earnings-per-impression value is the same ad unit as the ad unit with the highest bonus estimated earnings-per-impression value. If the two ad units are the same particular ad unit, the process proceeds to block 412 and ad delivery server computer 112 selects the particular ad unit as the ad unit to display. That is, the particular ad unit that has both the highest base estimated earnings-per-impression value and the highest bonus estimated earnings-per-impression value is selected as the ad unit to display.

If the ad unit with the highest base estimated earnings-per-impression value is not the same ad unit as the ad unit with the highest bonus estimated earnings-per-impression value, the process proceeds to block 414. At block 414, ad delivery system computer 112 selects the ad unit with the highest bonus estimated earnings-per-impression value as the ad unit to display.

At block 416, if the ad unit with the highest base estimated earnings-per-impression value is the same ad unit as the ad unit with the highest bonus estimated earnings-per-impression value, ad delivery server computer 112 selects the base bid value associated with the selected ad unit as the applicable payment price.

At block 418, if the ad unit with the highest base estimated earnings-per-impression value is not the same ad unit as the ad unit with the highest bonus estimated earning s-per-impression value, ad delivery server computer 112 selects an applicable payment price for the selected ad unit based on the bonus bid value associated with the selected ad unit. In some embodiments, the applicable payment price is the bonus bid value associated with the selected ad unit. In another embodiment, the applicable payment price may also be based on the bid value of the ad unit with the second highest bonus bid value from the set of eligible ad units. For example, the applicable payment price may be the bonus bid value of the ad unit with the second highest bonus bid value from the set of eligible ad units plus an additional nominal amount.

Using the approach illustrated in FIG. 4, the advertisement unit with the highest bonus bid value is selected as the ad unit to display. In some embodiments, the applicable payment price for the selected ad unit depends in part on whether the selected ad unit also had the highest base bid value.

An ad delivery system that employs an approach such as the approach illustrated in FIG. 4 may be more appealing to advertisers than traditional approaches. If the opportunity to present an ad unit during the circumstance specified by the advertiser-specified constraints is one that an advertiser considers highly valuable, he may freely associate a high bonus value with such an ad unit. For example, a particular ad unit may that only be eligible for display if two other related ad units of the compound advertisement have already been displayed and if the user associated with the receiving device is determined to be within a small highly targeted user demographic. The advertiser may consider the opportunity to present the ad unit in a circumstance that satisfies all those constraints as highly valuable because such an opportunity may be rare, likely to be profitable, or for other reasons. By associating a high bonus bid value, the advertiser can ensure a higher likelihood that the ad unit would be selected for delivery to the user. At the same time, by associating a lower base bid value with the same ad unit, the advertiser may ensure that the applicable bid value is unnecessarily high because the bonus bid value may only be considered the applicable bid value if the base bid value is too low.

In other embodiments, the bid values may be considered in some other way during the selection of an ad unit based on bid discrimination. For example, ad delivery server computer 112 may use base bid values and bonus bid values in choosing between the various eligible ad units rather than determining estimated earnings-per-impression values for ad units based on the base and bonus bid values associated with the ad units.

At block 212, ad delivery server computer 112 causes display of the particular ad unit at the particular user computing device. Ad delivery server computer 112 may cause display of the particular ad unit at a particular user computing device such as user computing device 102 by sending an electronic digital message to user computing device 102 where the message is configured to cause display of the particular ad unit at the particular user computing device.

Publisher app 104 may cause the particular ad unit to display at user computing device 102 in response to receiving the electronic digital message. In an embodiment, SDK logic 126 interprets the received electronic digital message and, in response, causes display of the particular ad unit.

In some embodiments, the ad unit may be capable of being clicked upon or interacted with. In such an embodiment, user computing device 102 may send indications of user interactions with the ad unit to ad delivery computer server 112.

2.3 Software Development Kit (SDK) Integration

Ad delivery server computer 112 may direct advertisements to apps that comply with an application programming interface (API) or software development kit (SDK) defined by the advertisement delivery service operator.

SDK logic 126 may be statically linked or dynamically linked to the rest of the code of publisher app 104 at the time that a developer prepares production versions of executables of the publisher app. Consequently, at runtime, SDK logic 126 may run as native code in user computing device 102. However, the source code for SDK logic 126 may be defined by the owner or operator of ad delivery server computer 112 and may not be known to the developer, author, or publisher, of publisher app 104, except possibly with respect to public interfaces or APIs that the owner or operator of the server computer elects to publish or disclose.

In one embodiment, SDK logic 126 comprises one or more public interfaces or APIs configured to enable a developer of publisher app 104 to map one or more app events of publisher app 104 to logic included in SDK logic 126. In this context, an app event may include any processing event, step, or programmatic action that may occur during execution of publisher app 104. For example, if publisher app 104 is a game app, an app event may represent a processing event that occurs during execution of publisher app 104 such as a user opening an in-game menu, the user beginning a particular level of the game, or the user ending a current game session. In an embodiment, a developer of publisher app 104 may identify in the logic of publisher app 104 one or more particular app events of publisher app 104 and cause the logic of publisher app 104 to interact with SDK logic 126 in response to an occurrence of the particular app events. For example, a developer may include a code segment or other logic in association with each of the particular app events that causes publisher app 104 to trigger SDK logic 126 when a particular app event occurs during execution of publisher app 104.

SDK logic 126 may further include logic enabling a developer of publisher app 104 to specify any number of custom app event types. For example, an app developer may identify one or more app event types the publisher wants to monetize but that are different from any of the pre-defined event types. In an embodiment, a developer of publisher app 104 may define a custom app event type using SDK logic 126 by providing a label for the custom app event type and mapping the custom app event type to a custom or pre-defined app event category. The label provided for the custom app event type may be used for display and configuration of the custom app event types with the advertising network service. For example, when an advertiser selects one or more app events types to associate with a particular ad units as acceptable app event types for triggering the display of the particular ad unit, the label provided for the custom app event type may be displayed as an identifier of a selectable app event type in the interface used by the advertiser.

The same label may be used during the registration of publisher app 104 to identify registration information relating to the monetization event such as minimum bid value for the monetization event, acceptable ad unit formats for the monetization event, or an app event category to which the monetization event belongs.

The label may be included in the notifications of monetization events sent from SDK logic 126 to ad delivery server computer 112 as an identifier of the monetization event. In some embodiments, ad delivery server computer 112 may use the label, at least in part, to look up the specification information applicable to the monetization event.

Although separate embodiments are discussed herein, any combination of embodiments and/or partial embodiments discussed herein may be combined to form further embodiments.

7.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
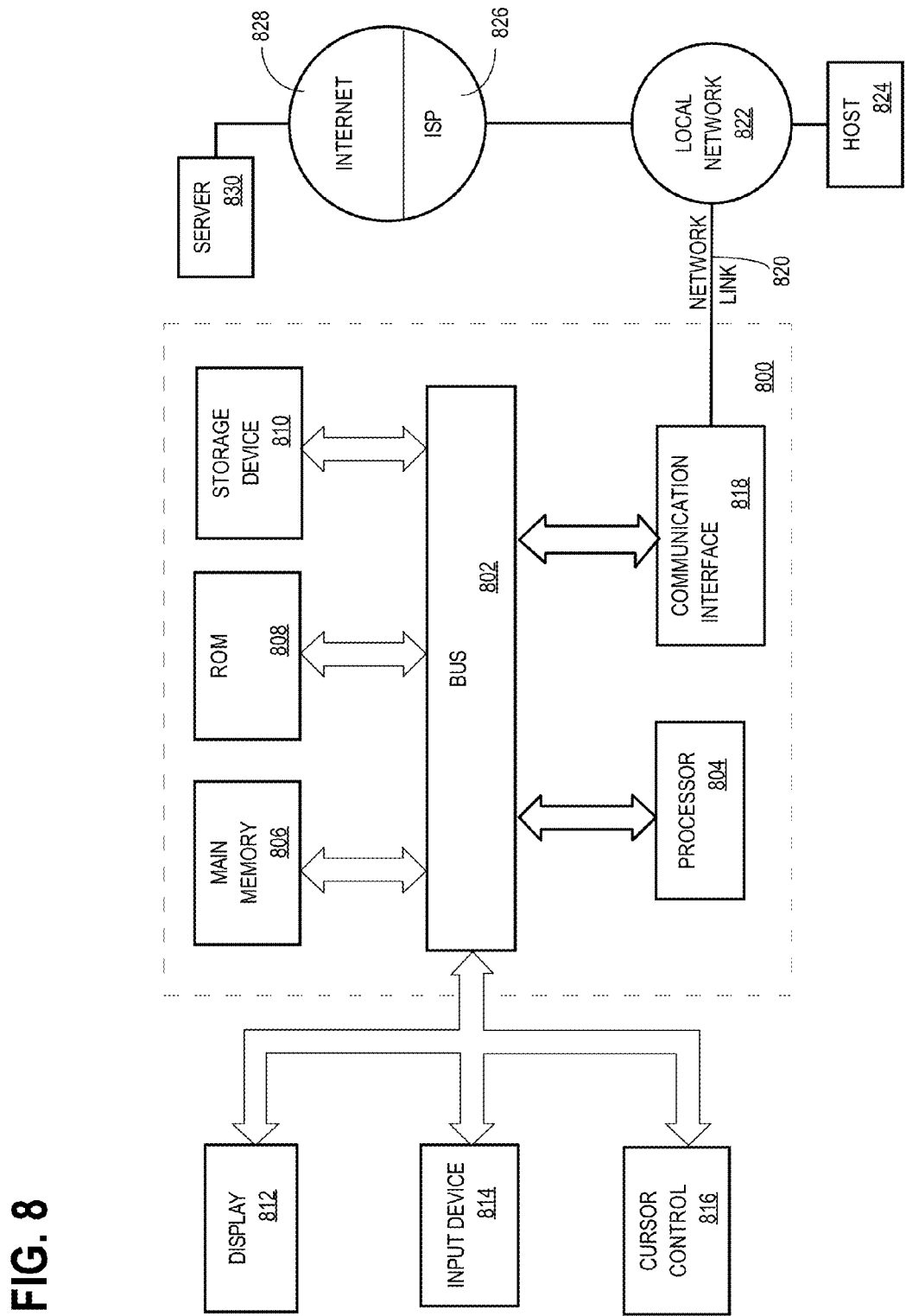
FIG. 8 illustrates a computer system upon which an embodiment may be implemented.

For example, FIG. 8 illustrates a computer system upon 800 which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method comprising:
receiving from an advertiser computer and by a local area network (LAN) interface, at an advertisement delivery server computer, a digital data specification of a compound advertisement comprising a plurality of ad units;
wherein the digital data specification of the compound advertisement specifies:
one or more sequential dependencies between one or more ad units of the plurality of ad units including a particular sequential dependency of a first ad unit upon a second ad unit of the same compound advertisement and at least one bid value for each ad unit of the plurality of ad units;
a base bid value and a bonus bid value for the first ad unit; and
a plurality of bid values for the first ad unit including a first bid value and a second bid value, wherein the first bid value is greater than the second bid value;
wherein the digital data specification of the compound advertisement associates a first app event type with the first ad unit and not with the second ad unit;
transferring the digital data specification into a memory of the advertisement delivery server computer;
using the advertisement delivery server computer, determining that a monetization event has occurred in a publisher application;
using the advertisement delivery server computer, determining that the second bid value associated with the first ad unit is less than at least one second bid value of a plurality of second bid values associated with the plurality of ad units;
based on the determination that the second bid value associated with the first ad unit is less than at least one second bid value of a plurality of second bid values associated with the plurality of ad units, the advertisement delivery server computer selecting from the memory an applicable payment price for the first ad unit based in part on the first bid value associated with the first ad unit;
using the advertisement delivery server computer, selecting from the memory, for display at a particular user mobile computing device separate from the advertisement delivery server computer, the first ad unit of the compound advertisement, wherein the selecting is based at least in part on:
the first bid value if the particular sequential dependency is satisfied,
the second bid value if the particular sequential dependency is not satisfied,
determining that the bonus bid value associated with the first ad unit is greater than a plurality of bonus bid values associated with the plurality of ad units, and
determining that the monetization event is of the first app event type;
transmitting as Internet Protocol (IP) packets by the LAN interface an electronic digital message from the advertisement delivery server computer to the particular user mobile computing device, wherein the message is configured to cause display of the first ad unit at the particular user mobile computing device.

2. The computer-implemented method of claim 1, further comprising:
using the advertisement delivery server computer, determining that the base bid value associated with the first ad unit is greater than each of a plurality of base bid values associated with the plurality of ad units;
based on the determination that the base bid value associated with the first ad unit is greater than each of a plurality of base bid values associated with the plurality of ad units, the advertisement delivery server computer selecting from the memory the base bid value associated with the first ad unit as an applicable payment price for the first ad unit.

3. The computer-implemented method of claim 1 further comprising:
using the advertisement delivery server computer, determining that the message configured to cause display of the second ad unit was previously transmitted to the particular user mobile computing device;
the advertisement delivery server computer selecting from the memory the first ad unit for display at the particular user mobile computing device based on the determination that the message configured to cause display of the second ad unit was previously transmitted to the particular user mobile computing device.

4. The computer-implemented method of claim 1, wherein the particular sequential dependency of the first ad unit upon a second ad unit of the same compound advertisement is a sequential dependency of the first ad unit upon a sequence of ad units comprising a third ad unit followed by the second ad unit, and wherein the message is a first message, the method further comprising:

using the advertisement delivery server computer, determining that a second message configured to cause display of the second ad unit and a third message configured to cause display of the third ad unit were previously transmitted to the particular user mobile computing device and that the third message was transmitted before the second message;

the advertisement delivery server computer selecting from the memory the first ad unit for display at the particular user mobile computing device based on the determination that the third message configured to cause display of the third ad unit and the second message configured to cause display of the second ad unit were previously transmitted to the particular user mobile computing device and that the third message was transmitted before the second message.

5. The computer-implemented method of claim 1, wherein the one or more sequential dependencies between one or more ad units of the plurality of ad units indicate that the first ad unit and a third ad unit, both of which are units of the same compound advertisement, are both sequentially dependent on the second ad unit;

the method further comprising:

the advertisement delivery server computer determining that a message configured to cause display of the second ad unit was previously transmitted to the particular user mobile computing device the advertisement delivery server computer determining that the particular sequential dependency of the first ad unit upon the second ad unit is associated with the first bid value;

the advertisement delivery server computer determining that a second sequential dependency of the third ad unit upon the second ad unit is associated with a third bid value;

the advertisement delivery server computer determining that the first bid value associated with the first sequential dependency of the first ad unit upon the second ad unit is greater than the third bid value associated with the second sequential dependency of the third ad unit upon the second ad unit;

the advertisement delivery server computer selecting from the memory the first ad unit for display at the particular user mobile computing device based on the determination that the first bid value associated with the first sequential dependency of the first ad unit upon the second ad unit is greater than the third bid value associated with the second sequential dependency of the third ad unit upon the second ad unit.

6. The computer-implemented method of claim 1, comprising using the advertisement delivery server computer to cause display of the second ad unit in response to a first app event in a first application and using the advertisement delivery server computer to cause display of the first ad unit in response to a second app event in a second application that is different from the first application.

7. The computer-implemented method of claim 1, wherein the first ad unit is associated with a particular constraint related to a target recipient, a target environmental attribute, or an advertisement format;

the method further comprising:

using the advertisement delivery server computer, determining that the particular constraint is satisfied;

the advertisement delivery server computer selecting from the memory the first ad unit for display at the particular user mobile computing device based at least in part on the determination that the particular constraint is satisfied.

8. A computer-implemented method comprising:

receiving from an advertiser computer and by a LAN interface, at an advertisement delivery server computer, a digital data specification of a compound advertisement comprising a plurality of ad units;

wherein the digital data specification of the compound advertisement specifies:

one or more sequential dependencies between one or more ad units of the plurality of ad units of the compound advertisement, including a particular sequential dependency of a first ad unit of the plurality of ad units upon a second ad unit of the plurality of ad units;

a base bid value and a bonus bid value for the first ad unit;

at least one bid value for each ad unit of the plurality of ad units; and a plurality of bid values for the first ad unit including a first bid value and a second bid value, wherein the first bid value is greater than the second bid value;

wherein the digital data specification of the compound advertisement associates a first app event type with the first ad unit and not with the second ad unit;

transferring the digital data specification into a memory of the advertisement delivery server computer;

the advertisement delivery server computer determining that a monetization event has occurred in a publisher application at a particular user mobile computing device;

in response to the determination that the monetization event has occurred in the publisher application at the particular user mobile computing device, performing:

using the advertisement delivery server computer, determining that the second bid value associated with the first ad unit is less than at least one second bid value of a plurality of second bid values associated with the plurality of ad units;

based on the determination that the second bid value associated with the first ad unit is less than at least one second bid value of a plurality of second bid values associated with the plurality of ad units, the advertisement delivery server computer selecting from the memory an applicable payment price for the first ad unit based in part on the first bid value associated with the first ad unit; and selecting from the memory, using the advertisement delivery server computer, the first ad unit of the compound advertisement for display at the particular user mobile computing device based at least on:

a determination by the advertisement delivery server computer that a first message configured to cause display of the second ad unit was previously transmitted to the particular user mobile computing device, a determination by the advertisement delivery server computer that the first ad unit is associated with a particular app event type and the monetization event is of app event type, a determination by the advertisement delivery server computer that the first bid value is greater than a bid value associated with a third ad unit, the bonus bid value associated with the first ad unit is greater than a plurality of bonus bid values associated with the plurality of ad units,
the first bid value if the particular sequential dependency is satisfied, and
the second bid value if the particular sequential dependency is not satisfied;
transmitting as IP packets by the LAN interface a second electronic digital message from the advertisement delivery server computer to the particular user mobile computing device, wherein the second electronic digital message is configured to cause display of the first ad unit at the particular user mobile computing device.

9. One or more non-transitory computer-readable storage media storing instructions which, when executed by one or more computing devices, cause:
receiving from an advertiser computer and by a LAN interface, at an advertisement delivery server computer, a digital data specification of a compound advertisement comprising a plurality of ad units;
wherein the digital data specification of the compound advertisement specifies:
one or more sequential dependencies between one or more ad units of the plurality of ad units including a particular sequential dependency of a first ad unit upon a second ad unit of the same compound advertisement and at least one bid value for each ad unit of the plurality of ad units;
a base bid value and a bonus bid value for the first ad unit; and
a plurality of bid values for the first ad unit including a first bid value and a second bid value, wherein the first bid value is greater than the second bid value;
wherein the digital data specification of the compound advertisement associates a first app event type with the first ad unit and not with the second ad unit;
transferring the digital data specification into a memory of the advertisement delivery server computer;
using the advertisement delivery server computer, determining that a monetization event has occurred in a publisher application;
using the advertisement delivery server computer, selecting from the memory, for display at a particular user mobile computing device separate from the advertisement delivery server computer, the first ad unit of the compound advertisement, wherein the selecting is based at least in part on:
the first bid value if the particular sequential dependency is satisfied,
the second bid value if the particular sequential dependency is not satisfied,
determining that the bonus bid value associated with the first ad unit is greater than a plurality of bonus bid values associated with the plurality of ad units, and
determining that the monetization event is of the first app event type;
transmitting as IP packets by the LAN interface an electronic digital message from the advertisement delivery server computer to a particular user mobile computing device, wherein the message is configured to cause display of the first ad unit at the particular user mobile computing device.

10. The non-transitory storage media of claim 9, wherein the instructions which, when executed by the one or more computing devices, further cause:
using the advertisement delivery server computer, determining that the base bid value associated with the first ad unit is greater than each of a plurality of base bid values associated with the plurality of ad units;
based on the determination that the base bid value associated with the first ad unit is greater than each of a plurality of base bid values associated with the plurality of ad units, the advertisement delivery server computer selecting from the memory the base bid value associated with the first ad unit as an applicable payment price for the first ad unit.

11. The non-transitory storage media of claim 9, wherein the instructions which, when executed by the one or more computing devices, further cause:
using the advertisement delivery server computer, determining that the message configured to cause display of the second ad unit was previously transmitted to the particular user mobile computing device;
the advertisement delivery server computer selecting from the memory the first ad unit for display at the particular user mobile computing device based on the determination that the message configured to cause display of the second ad unit was previously transmitted to the particular user mobile computing device.

12. The non-transitory storage media of claim 9, wherein the particular sequential dependency of the first ad unit upon a second ad unit of the same compound advertisement is a sequential dependency of the first ad unit upon a sequence of ad units comprising a third ad unit followed by the second ad unit, and wherein the message is a first message;
wherein the instructions which, when executed by the one or more computing devices, further cause:
using the advertisement delivery server computer, determining that a second message configured to cause display of the second ad unit and a third message configured to cause display of the third ad unit were previously transmitted to the particular user mobile computing device and that the third message was transmitted before the second message;
the advertisement delivery server computer selecting from the memory the first ad unit for display at the particular user mobile computing device based on the determination that the third message configured to cause display of the third ad unit and the second message configured to cause display of the second ad unit were previously transmitted to the particular user mobile computing device and that the third message was transmitted before the second message.

13. The non-transitory storage media of claim 9, wherein the one or more sequential dependencies between one or more ad units of the plurality of ad units indicate that the first ad unit and a third ad unit, both of which are units of the same compound advertisement, are both sequentially dependent on the second ad unit;
wherein the instructions which, when executed by the one or more computing devices, further cause:
the advertisement delivery server computer determining that a message configured to cause display of the second ad unit was previously transmitted to the particular user mobile computing device
the advertisement delivery server computer determining that the particular sequential dependency of the first ad unit upon the second ad unit is associated with the first bid value;
the advertisement delivery server computer determining that a second sequential dependency of the third ad unit upon the second ad unit is associated with a third bid value;

the advertisement delivery server computer determining that the first bid value associated with the first sequential dependency of the first ad unit upon the second ad unit is greater than the third bid value associated with the second sequential dependency of the third ad unit upon the second ad unit;

the advertisement delivery server computer selecting from the memory the first ad unit for display at the particular user mobile computing device based on the determination that the first bid value associated with the first sequential dependency of the first ad unit upon the second ad unit is greater than the third bid value associated with the second sequential dependency of the third ad unit upon the second ad unit.

14. The non-transitory storage media of claim 9, wherein the instructions which, when executed by the one or more computing devices, further cause using the advertisement delivery server computer to cause display of the second ad unit in response to a first app event in a first application and using the advertisement delivery server computer to cause display of the first ad unit in response to a second app event in a second application that is different from the first application.

15. The non-transitory storage media of claim 9, wherein the first ad unit is associated with a particular constraint related to a target recipient, a target environmental attribute, or an advertisement format;
wherein the instructions which, when executed by the one or more computing devices, further cause:
using the advertisement delivery server computer, determining that the particular constraint is satisfied;
the advertisement delivery server computer selecting from the memory the first ad unit for display at the particular user mobile computing device based at least in part on the determination that the particular constraint is satisfied.

16. One or more non-transitory storage media storing instructions which, when executed by one or more computing devices, cause:
receiving from an advertiser computer and by a LAN interface, at an advertisement delivery server computer, a digital data specification of a compound advertisement comprising a plurality of ad units;
wherein the digital data specification of the compound advertisement specifies:
one or more sequential dependencies between one or more ad units of the plurality of ad units of the compound advertisement, including a particular sequential dependency of a first ad unit of the plurality of ad units upon a second ad unit of the plurality of ad units;
a base bid value and a bonus bid value for the first ad unit;
a bid value for each ad unit of the plurality of ad units;
at least one bid value for each ad unit of the plurality of ad units; and a plurality of bid values for the first ad unit including a first bid value and a second bid value, wherein the first bid value is greater than the second bid value;
wherein the digital data specification of the compound advertisement associates a first app event type with the first ad unit and not with the second ad unit;
transferring the digital data specification into a memory of the advertisement delivery server computer;
the advertisement delivery server computer determining that a monetization event has occurred in a publisher application at a particular user mobile computing device;
in response to the determination that the monetization event has occurred in the publisher application at the particular user mobile computing device, selecting from the memory, using the advertisement delivery server computer, the first ad unit of the compound advertisement for display at the particular user mobile computing device based at least on:
a determination by the advertisement delivery server computer that a first message configured to cause display of the second ad unit was previously transmitted to the particular user mobile computing device,
a determination by the advertisement delivery server computer that the first ad unit is associated with a particular app event type and the monetization event is of app event type,
a determination by the advertisement delivery server computer that the first bid value is greater than a bid value associated with a third ad unit,
determining that the bonus bid value associated with the first ad unit is greater than a plurality of bonus bid values associated with the plurality of ad units,
the first bid value if the particular sequential dependency is satisfied, and
the second bid value if the particular sequential dependency is not satisfied;
transmitting as IP packets by the LAN interface a second electronic digital message from the advertisement delivery server computer to the particular user mobile computing device, wherein the second electronic digital message is configured to cause display of the first ad unit at the particular user mobile computing device.

17. The computer-implemented method of claim 1, wherein the plurality of bid values associated with the first ad unit includes a third bid value associated with a second sequential dependency of the first ad unit upon a third ad unit of the same compound advertisement.

18. The one or more non-transitory storage media of claim 9, wherein the plurality of bid values associated with the first ad unit includes a third bid value associated with a second sequential dependency of the first ad unit upon a third ad unit of the same compound advertisement.

* * * * *